US006676516B2

(12) United States Patent
Baerlocher et al.

(10) Patent No.: US 6,676,516 B2
(45) Date of Patent: *Jan. 13, 2004

(54) GAMING DEVICE HAVING AN INDICATOR SELECTION WITH PROBABILITY-BASED OUTCOME

(75) Inventors: Anthony J. Baerlocher, Reno, NV (US); Cari L. Blomquist, Reno, NV (US); Lance R. Peterson, Reno, NV (US)

(73) Assignee: IGT, Reno, NV (US)

(*) Notice: Subject to any disclaimer, the term of this patent is extended or adjusted under 35 U.S.C. 154(b) by 111 days.

This patent is subject to a terminal disclaimer.

(21) Appl. No.: 09/990,693

(22) Filed: Nov. 9, 2001

(65) Prior Publication Data

US 2002/0072403 A1 Jun. 13, 2002

Related U.S. Application Data

(63) Continuation-in-part of application No. 09/605,809, filed on Jun. 28, 2000, now Pat. No. 6,315,664.

(51) Int. Cl.[7] .................................................. A63F 13/00
(52) U.S. Cl. ............................. 463/25; 463/16; 463/20; 273/139; 273/138.1
(58) Field of Search ................................ 463/1, 16–20, 463/25; 273/138.1, 138.2, 143 R

(56) References Cited

U.S. PATENT DOCUMENTS 4,182,515 A * 1/1980 Nemeth ...................... 273/237
4,624,459 A 11/1986 Kaufman
4,991,848 A 2/1991 Greenwood et al.
5,116,055 A 5/1992 Tracy
5,456,465 A 10/1995 Durham
5,542,669 A 8/1996 Charron et al.
5,711,525 A 1/1998 Breeding
5,833,538 A 11/1998 Weiss
5,851,147 A * 12/1998 Stupak et al. ................. 463/13

(List continued on next page.)

FOREIGN PATENT DOCUMENTS

EP 0 874 337 A1 10/1998
EP 0 945 837 A2 9/1999
EP 0 984 409 A2 3/2000

OTHER PUBLICATIONS

Welcome To Video Reality Brochure written by Atronic Casino Technology Ltd. published in 1995.

Jackpot Party Brochures and Articles written by WMS Gaming Inc. published in 1998 and 2001.

High Low Card Game written by Qeocities.com (website) printed May 3, 2001.

Double Up Poker Game Description written by IGT published date unknown.

In Between Game Description written by IGT published date unknown.

*Primary Examiner*—S. Thomas Hughes
*Assistant Examiner*—Alex F. R. P. Rada, II
(74) *Attorney, Agent, or Firm*—Bell Boyd & Lloyd

(57) ABSTRACT

A gaming device which presents a plurality of indicators to the player. Each indicator may be a success indicator or a failure indicator based on a pre-determined probability. Upon or prior to the selection of the indicator, the processor in the gaming device determines, based on that probability, if the indicator is a success indicator or a failure indicator. When a player selects an indicator, the gaming device displays if the selected indicator is a failure indicator or a success indicator and a value associated with the success indicator. In one embodiment, the player selects indicators until the player selects all of the success indicators or the player selects a failure indicator. Accordingly, based on chance and the pre-determined probability, a game may include all success indicators and no failure indicators to increase player excitement and enjoyment.

33 Claims, 5 Drawing Sheets

U.S. PATENT DOCUMENTS

| | | | | | |
|---|---|---|---|---|---|
| 5,873,781 | A | | 2/1999 | Keane | |
| 6,015,346 | A | * | 1/2000 | Bennett | 463/20 |
| 6,089,976 | A | | 7/2000 | Schneider et al. | |
| 6,102,798 | A | | 8/2000 | Bennett | |
| 6,155,925 | A | | 12/2000 | Giobbi et al. | |
| 6,159,097 | A | | 12/2000 | Gura | |
| 6,159,098 | A | | 12/2000 | Slomiany et al. | |
| 6,190,255 | B1 | | 2/2001 | Thomas et al. | |
| 6,261,177 | B1 | * | 7/2001 | Bennett | 463/16 |
| 6,315,664 | B1 | * | 11/2001 | Baerlocher et al. | 463/21 |

* cited by examiner

GAMING DEVICE HAVING AN INDICATOR SELECTION WITH PROBABILITY-BASED OUTCOME

PRIORITY CLAIM

This application is a continuation-in-part application of U.S. patent application, Ser. No. 09/605,809, filed on Jun. 28, 2000, entitled "Gaming Device Having an Indicator Selection with Probability-Based Outcome Bonus Scheme, now U.S. Pat. No. 6,315,664."

CROSS-REFERENCE TO RELATED APPLICATIONS

This application is related to the following commonly-owned co-pending patent applications: "Gaming Device Having a Weighted Probability For Selecting A Bonus Game," Ser. No. 09/680,346, U.S. Pat. No. 6,565,436; "GAMING DEVICE HAVING A METHOD FOR RANDOMLY GENERATING A BONUS ROUND OUTCOME." Ser. No. 09/679.251. "Gaming Device With Bonus Scheme Having Multiple Award Levels," Ser. No. 09/602, 140, "Gaming Device Having A Competition Bonus Scheme," Ser. No. 09/628,144, now U.S. Pat. No. 6,406,369 B1; "Gaming Device Having A Bonus Round With A Win, Lose Or Draw Outcome," Ser. No. 09/722,763, now U.S. Pat. No. 6,425,824 B1; "Gaming Device Having An Indicator Selection With Probability-Based Outcome Bonus Scheme," Ser. No. 09/981,163, "Gaming Device Having a Multi-Characteristic Matching Game," Ser. No. 09/813,698, "GAMING DEVICE HAVING A BONUS ROUND WITH A WIN. LOSE OR DRAW OUTCOME." Ser. No. 10/163, 805, "GAMING DEVICE HAVING A COMPETITION BONUS SCHEME." Ser. No. 10/114,837, "GAMING DEVICE HAVING A MULTI-ROUND MULTI-CHARACTERISTIC MATCHING GAME." Ser. No. 10/243,706. "GAMING DEVICE HAVING A MULTI-ROUND MULTI-CHARACTERISTIC MATCHING GAME." Ser. No. 10/243,192, "GAMING DEVICE HAVING A GAME WITH DECREASING PROBABILITIES OF SUCCESS." Ser. No. 10/238,237, "GAMING DEVICE HAVING AN AWARD LEVEL DETERMINATION COMPETITION," Ser. No. 10/241,325, "GAMING DEVICE HAVING A METHOD FOR RANDOMLY GENERATING A BONUS ROUND OUTCOME." Ser. No. 10/437,656, and "GAMING DEVICE HAVING SEPARATELY CHANGEABLE VALUE AND MODIFIER BONUS SCHEME." Ser. No. 10/414,638,

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a primary game wherein players may select indicators which are either success or failure indicators based on a mathematical calculation using an independent probability for each indicator.

BACKGROUND OF THE INVENTION

Gaming machines currently exist with bonus schemes in which the player has one or more opportunities to choose a particular selection or indicator from a group of indicators. An indicator may be any symbol or image such as a number, letter or graphical representation of a person, place or thing. When a player chooses an indicator, the game will either award the player with a bonus value or terminate the bonus round. The outcome depends upon the particular indicator selected by the player.

When the player selects an indicator which awards a bonus value, the player receives one or more bonus values, and the player has another chance to select another indicator. Each time the player selects such a success indicator, the game typically provides an award to the player and displays a message for the player such as "NEXT." This message means that the bonus round continues and the player may choose another indicator. The player then selects another indicator, and this process continues until the player selects an indicator which terminates the bonus round. When the player selects such a failure indicator, typically the game displays a message for the player such as "COLLECT." This message means that the bonus round has terminated, and the player collects any bonus values the player accumulated.

Gaming machines with this type of bonus scheme are programmed so that in each bonus round certain indicators or a certain number or percentage of indicators are success indicators and certain indicators or a certain number or percentage of indicators are failure indicators. Consequently, the percentage of success indicators is predetermined and fixed. Therefore, when playing a bonus round, it is impossible for the player to select success indicators beyond the fixed percentage. Chance is involved in the timing as to when the player chooses a failure indicator—before or after achieving the fixed percentage of success indicators. European Patent Application No. EP 0 945 837 A2 filed on Mar. 18, 1999 and assigned on its face to WMS Gaming, Inc. discloses a bonus scheme generally of this type.

SUMMARY OF THE INVENTION

The present invention provides a gaming device which has a primary game which includes a plurality of selectable indicators wherein each of the selectable indicators has a certain independent probability of being a success indicator or a failure indicator. Similar to flipping a coin where the predetermined independent probability of being heads or tails is fifty percent, in the present invention there is a predetermined probability of each indicator being a success indicator or a failure indicator. Upon or prior to the selection of the indicator, the processor in the gaming device determines, based on that probability, if the indicator is a success indicator or a failure indicator. In one embodiment, all of the selectable indicators have the same probability. Alternatively, the selectable indicators may have different probabilities. Game manufacturers, casinos and others who commercialize the gaming device of the present invention may program the primary game with desired probabilities for success indicators and failure indicators, depending on the payout desired and the level of excitement desired. Accordingly, in any play of the primary game, all of the indicators may be success indicators.

When a player makes a wager, the primary game begins. The primary game begins by providing the player with a plurality of selectable indicators. In one embodiment, the game determines, based on the predetermined independent probability for each indicator whether each indicator is a success or a failure indicator. The player chooses an indicator. The processor of the gaming device, displays a success indicator or a failure indicator. In one embodiment of the present invention, if the processor displays a failure indicator, the primary game terminates. If the processor displays a success indicator, the game awards the player with a displayed award or value corresponding to the success indicator. The value numerals may themselves be the success indicator. The amount of the value for each success indicator may vary. After the player achieves a success indicator, the player receives the appropriate value, and the game gives the player another chance to choose another indicator.

In this embodiment, this process continues until the gaming device displays a failure indicator or until the player has chosen all of the indicators in the primary game, in which case, the primary game terminates. If the player chooses all of the indicators and they are all success indicators, the game may award the player with an achievement value, the primary game may automatically repeat the game or may provide a bonus game. Upon termination of the primary game, the game accumulates all of the credits which the player has won and awards them to the player.

In one embodiment of the present invention, the primary game is placed in the context of a dodgeball game. The indicators are represented by a plurality of target characters. A separate character throws balls at the target characters or indicators. The player decides which target character will try to catch the ball. Each target character can catch the ball or be hit by the ball. If the player chooses a target character who catches the ball (i.e., a failure indicator), the primary game ends. If the player chooses a target character who is hit by the ball (i.e., a success indicator), the game awards the player with a value. The primary game terminates when a target character catches a ball or after the ball hits all of the target characters in the primary game.

It is therefore an object of the present invention to provide a gaming device having a primary game with indicators having a predetermined probability-based outcome.

Another object of the present invention to provide a gaming device having a primary game wherein the percentage of success indicators is not predetermined or fixed.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
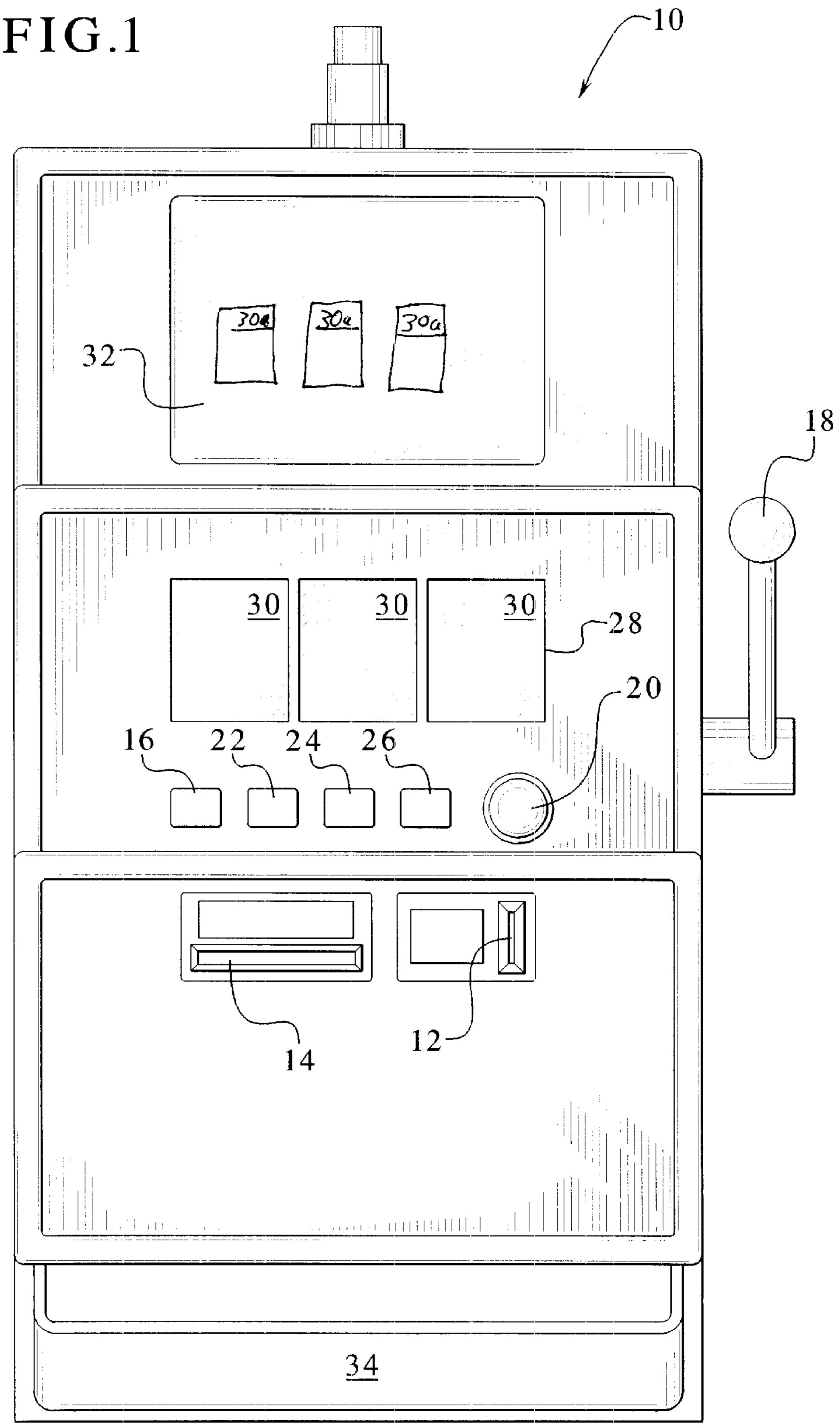
FIG. 1 is a front plan view one embodiment of the gaming device present invention.

Referring now to the drawings, FIG. 1 generally illustrates a gaming device 10 of one embodiment of the present invention, having the controls, displays and features of a conventional gaming machine. Gaming device 10 is constructed so that a player can operate gaming device 10 while standing. However, it should be appreciated that gaming device 10 can be constructed as a pub-style table-top game (not shown) which a player can operate while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can also incorporate any bonus triggering events which trigger a bonus scheme. The symbols and indicia used on and in gaming device 10 may be in mechanical, electrical or video form.

As illustrated in FIG. 1, gaming device 10 includes a coin slot 12 and bill acceptor 14 where the player inserts money. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 34. The gaming device 10 may employ other payout mechanisms such as credit slips redeemable by a cashier or electronically recordable cards which keep track of the player's credits.

Figure 2:
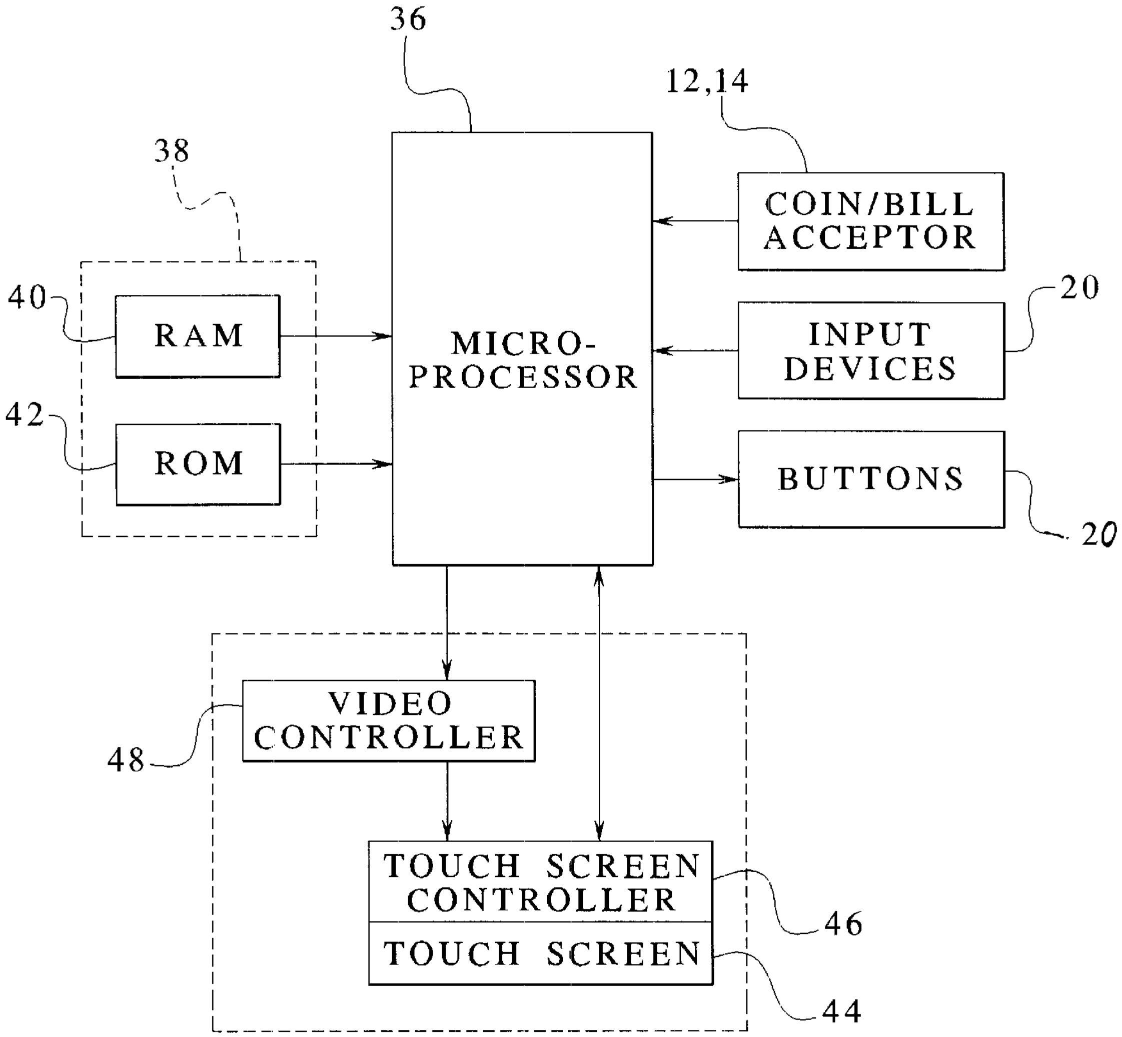
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device such as play buttons 20. The processor 36 is preferably a microprocessor or microcontroller-based platform which is capable of displaying images, symbols and other indicia such as images of people, characters, places, things and faces of cards. The memory device 38 can include random access memory (RAM) 40 for storing event data or other data generated or used during a particular game. The memory device 38 can also include read only memory (ROM) 42 for storing program code which controls the gaming device 10 so that it plays a particular game in accordance with applicable game rules and pay tables.

As illustrated in FIG. 2, in terms of input, the player uses play buttons 20 to input signals into gaming device 10, and preferably uses a touch screen 44 (and an associated touch screen controller 46). Touch screen 44 and touch screen controller 46 are connected to a video controller 48 and processor 36. A player can make decisions and input signals such as selecting indicators into the gaming device 10 by touching touch screen 44 at the appropriate places. As further illustrated in FIG. 2, the processor 36 can be connected to coin slot 12 or bill acceptor 14. The processor 36 can be programmed to require a player to deposit a certain amount of money in order to start the game.

It should be appreciated that although a processor 36 and memory device 38 are preferable implementations of the present invention, the present invention can also be implemented using one or more application-specific integrated circuits (ASIC's) or other hard-wired devices, or using mechanical devices. Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection, microwave link, and the like.

To operate the gaming device 10, the player must insert the appropriate amount of money at coin slot 12 or bill acceptor 14 and then pull the arm 18 or push the play button 20. As long as the player has credits remaining, the player can play again.

In addition to winning credits in the primary game, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device may also include a display device such as a video monitor 32 shown in FIG. 1 enabling the player to play a bonus round.

If a player makes a wager to play a game, the gaming device 10 automatically begins the primary game of the present invention. As indicated by block 50 in FIG. 3, the primary game of the present invention begins by providing a player with a plurality of indicators 30 separately or a plurality of indicator 30*a* on a display device 32 (FIG. 1). The indicators can display varying graphics and be of varying sizes, shapes and colors. The indicators are shown in FIG. 4 as squares in a grid, however, it should be appreciated that indicators can be separated and spread apart in an orderly or disorderly fashion.

Figure 3:
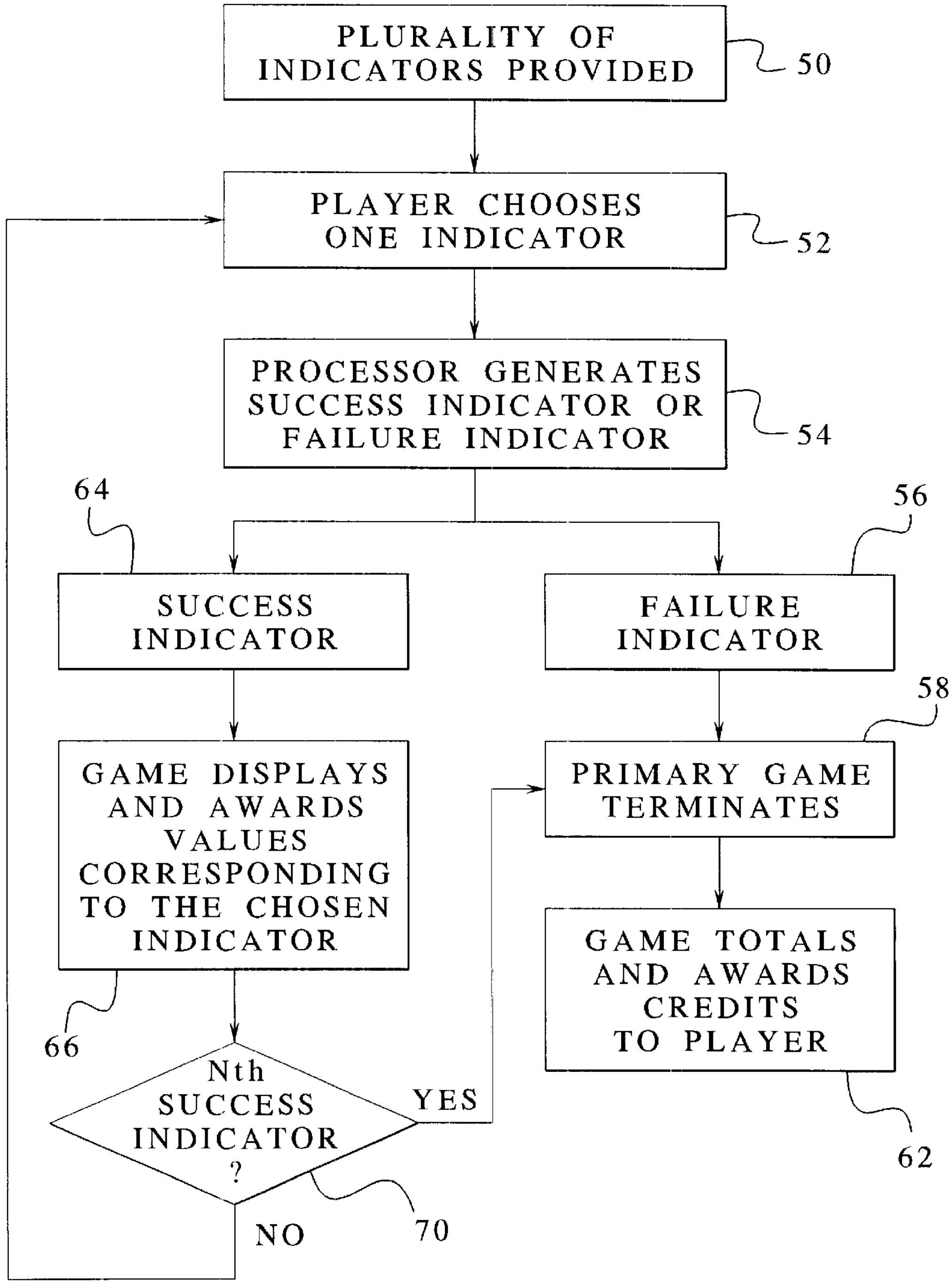
FIG. 3 is a flow diagram of one embodiment of the primary game of the present invention.
Figure 4:
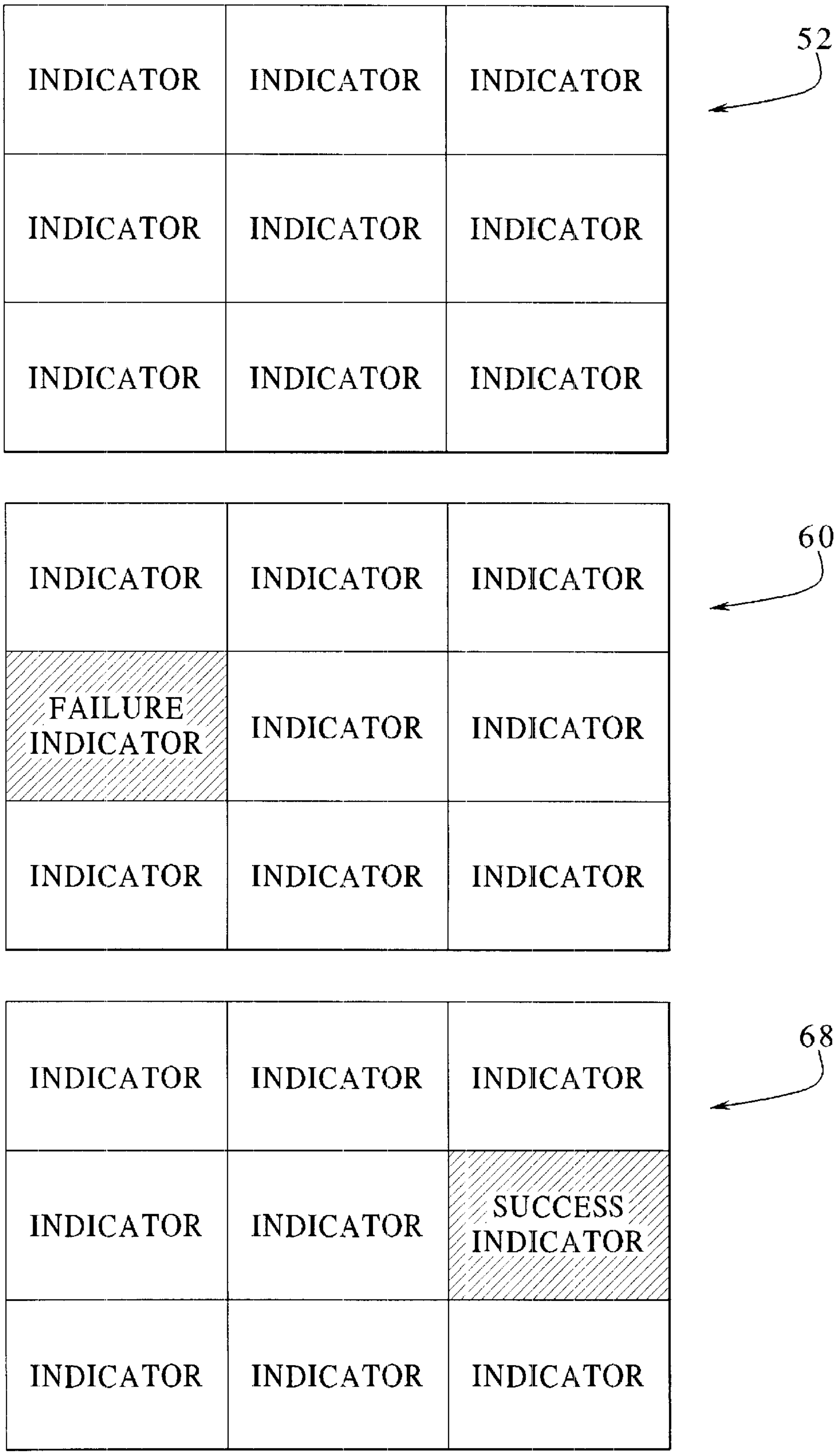
FIG. 4 is a top plan view of the indicators in one embodiment of the primary game of the present invention.

After reviewing the plurality of indicators, the player chooses one indicator by touching the indicators 30 or the screen 32 displaying the indicators, as indicated by block 52 in FIG. 3. Each time a player chooses an indicator, the processor 36 will generate either a success indicator or a failure indicator. When the player chooses an indicator, or preferably prior to displaying all the indicators to the player, the processor carries out one or more mathematical calculations based on predetermined independent probabilities for each indicator and determines if the indicator will be a success indicator or a failure indicator as indicated by block 54. In one embodiment, for all of the indicators for a particular primary game, the processor 36 uses the same probability of being a success indicator. Other embodiments of the present invention can use different probabilities which may or may not vary for each indicator.

As shown in FIG. 3, if processor 36 generates or displays a failure indicator as indicated by block 56, the primary game terminates as indicated by block 58. A failure indicator is generally illustrated in grid 60 in FIG. 4 (i.e., the player selected the indicator in the first column and second row which resulted in a failure indicator.)

Upon termination, the game accumulates any values and awards them to the player as indicated by block 62. If processor 36 generates or displays a success indicator, the game awards the player with values corresponding to the chosen indicator, as indicated by blocks 64 and 66. A success indicator is illustrated in grid 68 in FIG. 4 (i.e., the player selected the indicator in the third column and second row which resulted in a success indicator.) The success indicator may be a value of number of credits or symbol which represents a number of credits.

The processor 36 also determines how many success indicators the player has achieved, as indicated by diamond 70. In this embodiment, the maximum amount of success indicators any player can achieve is equal to the total number of indicators in any particular primary game. For instance, if a primary game has ten indicators, a player could achieve no more than ten success indicators.

If the amount of success indicators a player achieves is less than the total amount of indicators provided in the primary game, the player may select another indicator. This process continues until the processor 36 generates or displays a failure indicator or until the player has achieved the maximum amount of success indicators. In either case, preferably the primary game terminates as indicated by block 58, and the gaming device 10 awards credits to the player as indicated by block 62. It should be appreciated that the primary game of the present invention could be designed so that if a player achieves the maximum amount of success indicators, the game awards the player with an achievement value and/or the primary game is automatically renewed. The achievement value can be any amount and determined in any manner. Preferably, the achievement value is a predetermined value.

Furthermore, if processor 36 generates success indicators and failure indicators before the player chooses an indicators, the primary game can include a reveal screen. The primary game of the present invention can be designed so that when a choice results in a failure indicator, video monitor 32 shown in FIG. 1 graphically reveals the location of the success indicators and failure indicators. This reveal screen can increase the excitement experienced by a player because the player will know which indicators would have been successful.

Since the primary game of the present invention utilizes a probability-based mathematical calculation, a player may reach a failure indicator early in the primary game (i.e., within the player's first few choices). At some point after playing several primary games, players can become frustrated if, within their first few choices, they repeatedly reach a failure indicator. It should be appreciated that certain techniques can be used to minimize this type of frustration.

One technique requires processor 36 to perform its probability-based calculation before the player chooses an indicator. Processor 36 can discard its mathematical results and generate new results whenever a relatively high or predetermined percentage of failure indicators have been generated. This technique and others may be used to increase the likelihood that a player will achieve at least a minimal level of success and increase player excitement and enjoyment.

This primary game of the present invention provides players with an alternative type of element of chance not offered in known primary games. The game provides players with an opportunity to choose from a group of indicators. The outcome could be a success indicator or a failure indicator. The outcome is not fixed, limiting a player's chance of success. Instead, the outcome varies, depending upon a mathematical probability calculation. A player could thus choose all of the indicators, all resulting in success indicators. At the same time, upon a player's first choice, the outcome could be a failure indicator, ending the primary game. An additional value could be awarded if the player obtains all success indicators in the primary game. Alternatively, in such case, the primary game may be repeated.

Figure 5:
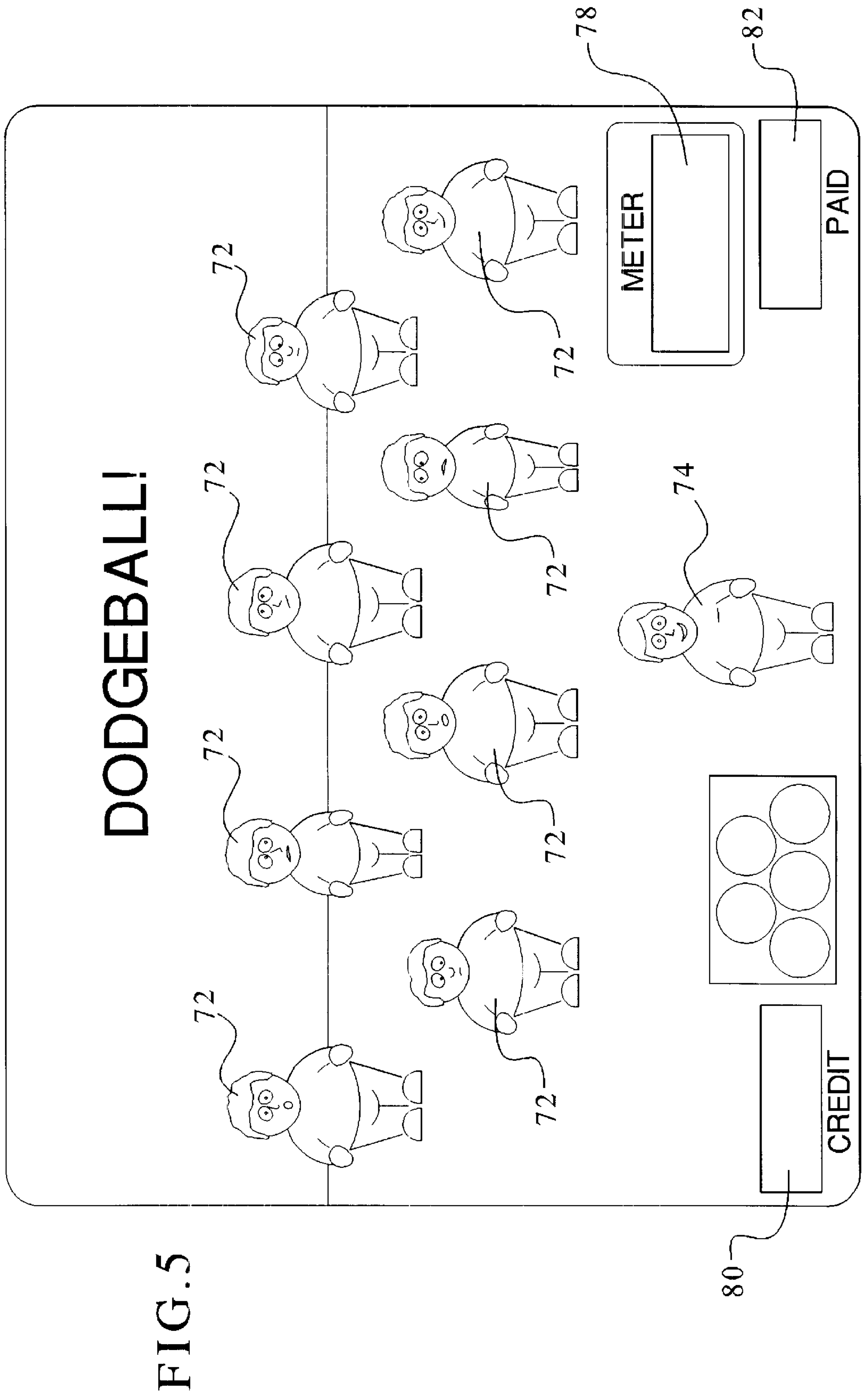
FIG. 5 is a top plan view of an alternative embodiment of the indicators of the primary game of the present invention.

In one embodiment of the present invention shown in FIG. 5, the primary game is implemented through target characters 72 participating in a dodgeball game. The target characters 72 are the indicators. Another character 74 throws a ball at a target character 72 selected by the player. The player chooses a target character 72 by touching touch screen 44 at the location of the image of the target character 72. After the player touches touch screen 44, the character 74 automatically retrieves a ball and throws it at the selected target character 72.

Prior to displaying the target characters 72 or when a player chooses a target character 72, the processor 36 performs mathematical calculations based on the predetermined probability for each indicator. The processor 36 generates or displays a success indicator or failure indicator for the chosen target character 72. If the processor 36 generates or displays a success indicator, the ball hits the target character 72 and bounces off the target character 72. The target character 72 is knocked over or off balance, and a credit appears near the target character 72. In addition meter 78, which displays a running total of all values will display the values which the player gained.

If the processor 36 generates or displays a failure indicator, the target character 72 catches the ball and the primary game terminates. In addition, if the player achieves a number of success indicators equal to the total number of target characters 70, the primary game automatically terminates. In either case, once the primary game terminates, the game accumulates and awards any credits which the player gained. The game displays the credit points which the player gained at credit meter 80. The game displays the amount of money the player has won in the paid window 82 illustrated in FIG. 5.

As shown in FIG. 5, the scenery for this embodiment is a gymnasium setting including one or more phrases such as "Let's Play Dodgeball!" In addition, this embodiment can include audio features (i.e., songs, voices, and other sound effects) which are consistent with the dodgeball theme of this preferred embodiment.

As discussed above, it should be appreciated that the primary game can provide the player with no award, an award less than the player's wager, an award equal to the player's wager or an award greater than the player's wager. For instance, in one embodiment, if the player wagers $0.25 and the player's first indicator is independently determined to be a failure indicator, the primary game ends and the player obtains no award. In another example, the player may make a wager of $0.25 and the player picks the first three selectable indicators which are success indicators. For each success indicator, the processor of the gaming device provides the player with a return of $0.05. On the fourth selected indicator, the player obtains a failure indicator. In this example, the player obtains an award less than the player's wager. In this example, if the player had picked five success indicators in a row, then the player would have obtained an award equal to the player's wager. In this example, if the player would have picked more than five selectable indicators which are success indicators, each subsequent success indicator would provide an award (and the player's total award would continue to increase above the player's wager). It should be appreciated that one of ordinary skill in the art can set or adjust the wager amounts and the award amounts in any suitable desired manner to provide any suitable desired paytable. It should also be appreciated that the independent probability success percentage or award percentage may be suitably adjusted to provide the appropriate paytable. It should also be appreciated that the primary game may alternatively not end when a player picks an indicator that is a selectable indicator. Instead, the game may enable the player to one or more or all of the rest of the selectable indicators.

In an alternative embodiment of the present invention, the gaming device may require the player to obtain a certain number of success indicators or a threshold number of success indicators before providing the player with any award. For example, the player may be required to obtain five out of ten success indicators to obtain an award. Additionally, in such alternative embodiment, each additional success indicator above the threshold could provide a larger award to the player. For instance, the sixth success indicator could provide double the player's award, the seventh success indicator could provide triple the award, the eighth success indicator could provide four times the award, the ninth success indicator could provide five times the award and the tenth success indicator could provide a larger award or jackpot to the player. It should be appreciated that the number of selectable indicator and the associated independent success probabilities for each indicator could be arranged in any suitable manner desired by the game implementor as discussed above. It should also be appreciated that the number of selectable indicators could vary, and that the number of selectable indicators, independent success probabilities associated with the selectable indicators and the awards associated with the success indicators or threshold(s) could vary based on the amount of the player's wager. It should also be appreciated that certain thresholds of success indicators or success indicators obtained in a row (in the embodiment where a failure indicator does not end the game) could be employed to trigger additional awards, trigger bonus games, trigger jackpots and re-trigger the primary game.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

a primary game including a plurality of selectable indicators, and an independent award probability associated with each of said selectable indicators;

a display device which displays the selectable indicators; and a processor for communicating with said display device, activating a plurality of said indicators for selection when a player makes a wager, independently determining if an award is associated with each selected indicator after said selected indicator is selected and based on the independent award probability associated with said selected indicator, and providing a player any award associated with each selected indicator.

2. The gaming device of claim 1, wherein the primary game ends if the processor determines that an award is not associated with a selected indicator based on the independent award probability associated with said selected indicator.

3. The gaming device of claim 1, wherein the independent award probability associated with each of said selectable indicators is the same.

4. The gaming device of claim 1, which includes a plurality of different independent award probabilities associated with different selectable indicators.

5. The gaming device of claim 1, wherein the selectable indicators are player selectable.

6. The gaming device of claim 5, wherein the display device includes a touch screen which enables the player to select the selectable indicators.

7. The gaming device of claim 1, wherein the independent award probabilities for the selectable indicators are randomly determined.

8. The gaming device of claim 1, which includes different awards associated with different selectable indicators.

9. A gaming device comprising:

primary game including a plurality of selectable indicators and an independent award probability associated with each of said selectable indicators;

a display device which displays the selectable indicators; and a processor for communicating with said display device, activating a plurality of said indicators for selection when a player makes a wager, independently determining if an award is associated with a plurality of the selectable indicators before the selectable indicators are selected and based on the independent award probabilities associated with said selectable indicators, and providing a player any award associated with each selectable indicator after said selectable indicator is selected.

10. The gaming device of claim 9, wherein the primary game ends if the processor has determined that an award is not associated with a selectable indicator based on the independent award probability associated with said selectable indicator and said selectable indicator is selected.

11. The gaming device of claim 9, wherein the independent award probability associated with each selectable indicator is the same.

12. The gaming device of claim 9, which includes a plurality of different independent award probabilities associated with said selectable indicators.

13. The gaming device of claim 9, wherein the selectable indicators are player selectable.

14. The gaming device of claim 13, wherein the display device includes a touch screen which enables the player to select the selectable indicators.

15. The gaming device of claim 9, wherein the independent award probabilities for the selectable indicators are randomly determined.

16. The gaming device of claim 9, which includes a plurality of different awards associated with said selectable indicators.

17. A gaming device comprising:

primary game including a plurality of player selectable indicators, each of said selectable indicators being a success indicator or a failure indicator, and an independent probability of success associated with each of said selectable indicators;

a display device for displaying said selectable indicators;

a selector for enabling a player to select said selectable indicators; and a processor for communicating with said display device and said selector, independently determining if each selected indicator is a success indicator or a failure indicator after a player selects said selected indicator and based on the independent probability of success associated with said selected indicator, and providing an award, if any, to said player for based on the number of selected indicators which are success indicators.

18. The gaming device of claim 17, wherein the primary game ends if, after said player selects one of the selectable indicators, the processor determines that said selected indicator is a failure indicator based on the independent probability of success associated with said selected indicator.

19. The gaming device of claim 17, which includes an additional award provided to the player if a plurality of the selected indicators are success indicators.

20. The gaming device of claim 17, which includes an additional award provided to the player if all of the selected indicators are success indicators.

21. The gaming device of claim 17, which includes a plurality of different awards provided to the player based on different numbers of selected indicators which are success indicators.

22. A gaming device comprising:

a primary game including a plurality of player selectable indicators, each said selectable indicator being a success indicator or a failure indicator, and an independent probability of success associated with each of said selectable indicators;

a display device for displaying said selectable indicators;

a selector for enabling a player to select said selectable indicators; and a processor for communicating with said display device and said selector, independently determining if each selectable indicator is a success indicator or a failure indicator before a player selects said selectable indicators and based on the independent probabilities of success associated with said selectable indicators and providing an said award, if any, to said player based on the number of selected indicators which are selected by the player and are success indicators.

23. The gaming device of claim 22, wherein the primary game ends if a selected indicator is a failure indicator based on the independent probability of success associated with said selected indicator as determined by the processor.

24. The gaming device of claim 22, which includes an additional award provided to the player if a plurality of the selected indicators are success indicators.

25. The gaming device of claim 22, which includes an additional award provided to the player if all of the selected indicators are success indicators.

26. The gaming device of claim 22, which includes a plurality of different awards provided to the player based on different numbers of selected indicators being success indicators.

27. A gaming device comprising:

at least one memory device;

a display device;

a processor connected to the memory device and the display device;

a plurality of instructions stored in the memory device, said instructions for causing the processor and display device to:

(a) initiate a primary game upon a wager by the player on the primary game;

(b) display a plurality of player selectable indicators;

(c) enable a player to select one of said selectable indicators;

(d) independently determine if an award is associated with the selected indicator based on an independent award probability associated with said selected indicator;

(e) display the award, if any, associated with said selected indicator;

(f) repeat steps (c) to (e) until an award is not associated with one of the selected indicators or until the player has selected all of the selectable indicators; and (g) end the primary game.

28. The gaming device of claim 27, wherein the instructions cause the processor to determine any awards which are associated with the selectable indicators prior to enabling the player to select said selectable indicators.

29. The gaming device of claim 27, wherein the instructions cause the processor to determine any award which is associated with a selected indicator following the player's selection of said selected indicator.

30. A method for providing a primary game in a gaming device, said method comprising the steps of:

(a) displaying a plurality of selectable indicators to a player upon a wager by the player, each said selectable indicator having a pre-determined probability of being a success indicator or a failure indicator;

(b) enabling the player to select one of said selectable indicators;

(c) independently determining if said selected indicator is a success indicator or failure indicator based on the pre-determined probability associated with said selected indicator after the player selects said selected indicator;

(d) displaying if the selected indicator is a success indicator or failure indicator;

(e) repeating steps (b) to (d) until the player selects all of the selectable indicators or the player selects a selectable indicator which is a failure indicator; and (f) providing the player with an award selected indicators which are success indicators.

31. A method for providing a primary game in a gaming device, said method comprising the steps of:

(a) displaying a plurality of selectable indicators to a player upon a wager by the player, each said selectable indicator having a pre-determined probability of being a success indicator or a failure indicator;

(b) enabling the player to select one of said selectable indicators;

(c) independently determining if said selected indicator is a success indicator or failure indicator based on the pre-determined probability associated with said selected indicator after the player selects said selected indicator;

(d) displaying if the selected indicator is a success indicator or failure indicator;

(e) repeating steps (b) to (d) until the player selects all of the selectable indicators or the player selects an indicator which is a failure indicator; and (f) providing the player with an award if the player selects at least a predetermined number of indicators which are success indicators.

32. A method for providing a primary game in a gaming device, said method comprising the steps of:

(a) displaying a plurality of selectable indicators to a player upon a wager by a player, each said selectable indicator having a pre-determined probability of being a success indicator or a failure indicator;

(b) independently determining if each said selectable indicator is a success indicator or failure indicator based on the pre-determined probability associated with said selectable indicators before the player selects said selectable indicators;

(c) enabling the player to select one of said selectable indicators;

(d) displaying if the selected indicator is a success indicator or failure indicator;

(e) repeating steps (c) to (d) until the player selects all of the selectable indicators; and (f) providing the player with any awards associated with the selected indicators which are success indicators.

33. A method for providing a primary game in a gaming device, said method comprising the steps of:

(a) displaying a plurality of selectable indicators to a player upon a wager by the player, each said selectable indicator having a pre-determined probability of being a success indicator or a failure indicator;

(b) independently determining if each said selectable indicator is a success indicator or failure indicator based on the pre-determined probability associated with said selectable indicators before the player selects said selectable indicators;

(c) enabling the player to select one of said selectable indicators;

(d) displaying if the selected indicator is a success indicator or failure indicator;

(e) repeating steps (c) to (d) until the player selects all of the selectable indicators; and (f) providing the player with an award if the player selects at least a predetermined number of selectable indicators which are success indicators.

* * * * *